(12) United States Patent
Dallesasse et al.

(10) Patent No.: US 7,325,983 B1
(45) Date of Patent: Feb. 5, 2008

(54) 10GBASE-LX4 OPTICAL TRANSCEIVER IN XFP PACKAGE

(75) Inventors: John Dallesasse, Geneva, IL (US); Thomas Whitehead, Chicago, IL (US); Paul Wachtel, Arlington Heights, IL (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/510,157

(22) Filed: Aug. 25, 2006

(51) Int. Cl.
*G02B 6/36* (2006.01)
*H04B 10/00* (2006.01)
*H01R 33/945* (2006.01)

(52) U.S. Cl. ............... 385/92; 385/88; 385/1; 385/2; 385/14; 385/24; 398/79; 398/135; 398/139; 439/577

(58) Field of Classification Search ............ 385/1, 385/2, 8, 9, 14, 24, 49, 88, 89, 92; 398/79, 398/82, 89, 90, 91, 135, 138, 139; 439/577
See application file for complete search history.

(56) References Cited

U.S. PATENT DOCUMENTS

| | | | |
|---|---|---|---|
| 6,811,326 B2 * | 11/2004 | Keeble et al. ............ 385/92 |
| 6,975,642 B2 | 12/2005 | Levinson et al. ......... 370/445 |
| 7,003,230 B2 | 2/2006 | Branch et al. ............ 398/135 |
| 2001/0043379 A1 * | 11/2001 | Bloom et al. ............ 359/152 |
| 2002/0018625 A1 * | 2/2002 | Grann et al. ............ 385/88 |
| 2002/0067619 A1 | 6/2002 | Ikeda et al. ............ 362/512 |
| 2002/0196500 A1 * | 12/2002 | Cohen et al. ............ 359/152 |
| 2003/0151600 A1 | 8/2003 | Tekeuchi et al. ......... 345/204 |
| 2004/0022544 A1 | 2/2004 | Case et al. ............ 398/137 |
| 2004/0190274 A1 | 9/2004 | Saito et al. ............ 361/783 |
| 2005/0084268 A1 * | 4/2005 | Weigert ............ 398/135 |
| 2005/0084269 A1 * | 4/2005 | Dallesasse et al. ......... 398/135 |
| 2005/0196111 A1 * | 9/2005 | Burdick et al. ............ 385/92 |
| 2005/0286902 A1 * | 12/2005 | Pierce et al. ............ 398/139 |
| 2006/0056776 A1 * | 3/2006 | Scheibenreif et al. ......... 385/89 |
| 2006/0067619 A1 | 3/2006 | Welch et al. ............ 385/37 |
| 2006/0126306 A1 | 6/2006 | Blair et al. ............ 361/716 |
| 2006/0147215 A1 * | 7/2006 | Hahin et al. ............ 398/135 |
| 2006/0147217 A1 | 7/2006 | Hahin et al. ............ 398/135 |

OTHER PUBLICATIONS

"10GBASE-LX4 Pushes Multimode Fiber Limits", by Amir Bar-Niv, Dimitry Taich, John Dallesasse, Reginald Ball, Paul Wachtel, Tom Whitehead; CommsDesign and EE Times Community; Aug. 17, 2006.

* cited by examiner

*Primary Examiner*—Brian M. Healy

(57) ABSTRACT

An optical transceiver for including an electrical connector with a serial interface for coupling with an external electrical cable or information system device, a fiber optic connector adapted for coupling with an external optical fiber, and an electro-optical subassembly for converting between an information containing electrical signal and a modulated optical signal corresponding to the electrical signal including a transmitter subassembly including at least first and second lasers operating at different wavelengths and modulated with respective first and second electrical signals for emitting first and second laser light beams, and an optical multiplexer for receiving the first and second beams and multiplexing the respective optical signals into a single multi-wavelength beam.

9 Claims, 4 Drawing Sheets

10GBASE-LX4 OPTICAL TRANSCEIVER IN XFP PACKAGE

REFERENCE TO RELATED APPLICATIONS

This application is related to U.S. patent application Ser. No. 10/866,265 filed Jun. 14, 2004, now U.S. Pat. No. 7,137,744, assigned to the common assignee.

This application is related to co-pending U.S. patent application Ser. No. 10/879,775 filed Jun. 28, 2004, assigned to the common assignee.

This application is related to co-pending U.S. patent application Ser. No. 11/266,152 filed Nov. 3, 2005, assigned to the common assignee.

This application is related to co-pending U.S. patent application Ser. No. 11/517,868 filed Sep. 8, 2006, assigned to the common assignee.

This application is related to co-pending U.S. patent application Ser. No. 11/517,870 filed Sep. 8, 2006, assigned to the common assignee.

This application is related to co-pending U.S. patent application Ser. No. 10/896,721 filed Jul. 23, 2004, assigned to the common assignee.

This application is related to co-pending U.S. patent application Ser. No. 11/185,008 filed Jul. 19, 2005, assigned to the common assignee.

This application is related to co-pending U.S. patent application Ser. No. 11/522,198 filed Sep. 15, 2006, assigned to the common assignee.

This application is related to co-pending U.S. patent application Ser. No. 11/551,047 filed Oct. 19, 2006, assigned to the common assignee.

BACKGROUND OF THE INVENTION

1. Field of the Invention

The invention relates to optical transceivers, and in particular to Ethernet (IEEE 802.3ae standard) compliant transceivers that provide a 10 Gigabit per second communications link between computers or communications units over optical fibers, such as used in high throughput fiber optic communications links in local and wide area networks and storage networks.

2. Description of the Related Art

A variety of optical transceivers are known in the art which include an optical transmit portion that converts an electrical signal into a modulated light beam that is coupled to a first optical fiber, and a receive portion that receives a second optical signal from a second optical fiber and converts it into an electrical signal.

Optical transceivers are packaged in a number of standard form factors which are "hot pluggable" into the chassis of the communications data system unit. Standard form factors provide standardized dimensions and electrical input/output interfaces that allow devices from different manufacturers to be used interchangeably. Some of the most popular form factors include XENPAK (see www.xenpak.org), X2 (see www.X2 msa.org), SFF ("small form factor"), SFP ("small form factor pluggable"), and XFP ("10 Gigabit Small Form Factor Pluggable", see www.XFPMSA.org).

Although these conventional pluggable designs have been used successfully in the past for low data rate protocol, challenge miniaturization for which is an ever-constant objective in the industry. It is desirable to miniaturize the size of transceivers in order permit greater port density associated with the electrical network connection, such as, for example, the input/output ports of switch boxes, cabling patch panels, wiring closets, and computer I/O interfaces.

The XFP module is a hot-pluggable, serial-to-serial optical transceiver that supports SONET OC-192, 10 Gigabit Ethernet, 10-Gbit/s Fibre Channel, and G.709 links. The module is 78 mm in length, 18.4 mm in width, and 8.5 mm in height. This small size limits the amount of electrical circuitry that can be implemented in the package, and consequentially in the prior art the majority of electronic signal processing is located in devices on the host board (inside the computer or network unit) rather than within the module in current commercial XFP devices. The XFP form factor features a serial 10 Gbit/s electrical interface called XFI that assumes that the majority of electronic signal processing functions are located within the circuits or ASICs on the system printed circuit board rather than within the optical transceiver module. Since the electronic processing defines the communication protocol, the XFP module is protocol independent.

The XFI interface is a differentially signaled, serial interconnect with nominal baud rate between 9.95 and 10.75 Gbit/s. Transmit and receive signals are AC coupled, 100-ohm differential pairs. The electrical interconnect may include combinations of microstrip and/or stripline traces on the printed circuit board up to 12 in. (300 mm) in length, with layer-to-layer or through-hole via structures, a 30-pin connector, and a BGA ASIC package.

One of the most important optical communications protocols is the 10 Gigabit per second Ethernet standard (GbE). The 10 Gigabit Ethernet standard specifications are set forth in the IEEE 802.3ae supplement to the IEEE 802.3 Ethernet standard. The supplement extends the 802.3 protocol and MAC specification to an operating speed of 10 Gb/s. Several Physical Coding Sublayers known as 10 GBASE-X, 10 GBASE-R and 10-GBASE-W are specified, as well as a 10 Gigabit Media Independent Interface (XGMII), a 10 Gigabit Attachment Unit Interface (XAUI) a 10 Gigabit Sixteen-Bit Interface (XSBI) and management.

The 10GBASE-LX4 media type uses wave division multiplexing technology to send signals over four wavelengths of light carried over a single pair of fiber optic cables. The use of course wavelength division multiplexing (CWDM) allows four optically multiplexed channels each transmitting a 3.125 Gb/sec signal over a single fiber pair (i.e. utilizing one fiber for each direction), as set forth in IEEE 802.3ae Clause 53, setting forth the 10GBASE-LX4 Physical Media Dependent (PMD) sublayer. An optical transceiver designed for operating in conformance with such protocol is described in U.S. patent Ser. No. 10/866,265, herein incorporated by reference. The 10GBASE-LX4 system is designed to operate at 1310 nm over multi-mode or single-mode dark fiber. The design goal for this media system is from two meters up to 300 meters over multimode fiber or from two meters up to 10 kilometers over single-mode fiber, with longer distances possible depending on cable type and signal quality requirements.

WDM high date rate applications have found widespread application in short reach Ethernet networks. Ethernet (the IEEE 802.3 standard) is the most popular data link network protocol. The Gigabit Ethernet Standard (IEEE 802.3) was released in 1998 and included both optical fiber and twisted pair cable implementations. The 10 GB/sec Ethernet standard (IEEE 802.3 ae) was released in 2002 with both optical fiber and twisted pair cabling. The difficulties associated with multi-gigabit signaling over existing wiring has limited the applications for such cabling, although efforts are currently underway for new copper cabling standards.

Among the many features defined in the 10 Gigabit Ethernet draft standard is the XAUI (pronounced "Zowie") interface. The "AUI" portion is borrowed form the Ethernet Attachment Unit Interface. The "X" represents the Roman numeral for ten and implies ten gigabits per second. The XAUI is a low pin count, self-clocked serial bus designed as an Interface extender for the 74 signal wide interface (32-bit data paths for each of transmit and received) XGMII. The XAUI may be used in place of, or to extend, the XGMII in chip-to-chip applications typical of most Ethernet MAC to PHY interconnects In the transmit direction, the MAC parallel electrical interface (XAUI) is monitored and retimed by the physical layer device (PHY). The XAUI bus is a four lane, 8b/10b encoded, 3.125 Gb/s CML electrical signal. Much like scrambling in traditional SONET systems, 8b/10b encoding ensures DC-balance (the average number of logic ones is equal to the average number of logic zeros) and a minimum transition density simplifying the optical architecture. The retimed XAUI bus modulates an optical transmitter array, generating four optical Non-Return-to-Zero (NRZ) waveforms. Each optical transmitter operates at a different wavelength, near 1310 nm with 24.5 nm center spacing and 13 nm tolerance. The optical signals are wavelength division multiplexed for transmission over a single fiber.

In the received direction, the CWDM signal is optically demultiplexed into its four constituent wavelengths. A quad receiver array converts the demultiplexed optical signals into four 3.125 Gb/s electrical signals. The PHY device performs clock recovery on each data lane, retimes the signal, and monitors the network interface performance. The retimed XAUI interface is then transmitted to the MAC device.

The fact that 10GBASE-LX4 is simply an optical extension of the XAUI interface may call into question whether or not the PHY device is always required. In fact, IEEE 802.3ae does not explicitly define a requirement for the PHY device and remains intentionally vague on the implementation details. However, the PHY device performs two very important tasks, which cannot be easily addressed in its absence.

First, the XAUI interface was originally defined to extend the system reach between layer 2 and layer 1 devices while simultaneously reducing the pin count requirements of small form factor pluggable modules. This interface is loosely defined to support 5 cm (two inches) of FR-4 material. In a typical 10GBASE-LX4 module-based implementation, the XAUI interface would be subject to transmission distances on the order of 10 cm (4 inches) on each of four independent substrates, plus two connector interfaces. With additional penalties due to the electrical-to-optical and optical-to-electrical conversion combined with impairments introduced by the transmission media, XAUI amplitude and phase noise limits will likely be exceeded. Highly integrated PHYs, such as the Quake Technologies QT2044, provide full 3R (recover, retime, reshape) regeneration with compliance to the IEEE 802.3ae 10GBASE-LX4 and XAUI specifications.

Secondly, the 10GBASE-LX4 standard also requires conformance to the XGXS and PCS/PMA physical layer clauses, which contain an extensive set of registers for provisioning and performance monitoring. The majority of these registers is associated with XAUI performance and is best handled within a high-speed PHY device. In addition, PHY devices specifically designed for 10GBASE-LX4 applications, such as the QT2044, integrate management for the pluggable module non-volatile memory space and Diagnostic Optical Monitoring (DOM) devices defined within the XENPAK, XPAK, and X2 Multi-Source Agreements.

The electrical input to the optical transceiver is a serial 10 Gbit/sec XFI interface. In order to produce a 10GBASEOLX4 optical signal, the electrical input must be converted into a four lane XAUI signal, with each lane applied to and modulating a different laser.

Although single chip integrated circuits such as the Puma AEL1002 are commercially available, such chips are designed for implementation on the host side, and convert four lanes of 3.125 Gbps/XAUI data signals from the host into a 10 Gbps XFI data signal which is applied to the XFP module. Since the optical signal being transmitted by such existing modules is a serial 10 Gbps signal, there has been no need for an XFI to XAUI data signal conversion.

Prior to the present invention, there has not been a suitable transceiver for high speed (10 Gigabits/sec. or more) optical transmission in a very small (XFP type) form factor.

SUMMARY OF THE INVENTION

1. Objects of the Invention

It is an object of the present invention to provide an improved high speed optical transceiver using a serial electrical interface in a small pluggable standardized form factor.

It is also another object of the present invention to provide an optical transceiver in an XFP form factor for use in an optical fiber transmission system with an industry standard 10GBASE-LX4 physical layer.

It is still another object of the present invention to provide an optical transceiver for use in an optical wavelength division multiplexed (WDM) transmission system suitable for short range and long haul applications using multiple semiconductor laser chips and a serial electrical interface.

It is also another object of the present invention to provide an optical transceiver in an XFP form factor for use with an XFI serial interface.

2. Features of the Invention

Briefly, and in general terms, the present invention provides an optical transceiver for converting and coupling an information-containing electrical signal with an optical fiber including a housing including an electrical connector with a serial XFI interface for coupling with an external electrical cable or information system device and a fiber optic connector adapted for coupling with an external optical fiber, at least one electro-optical subassembly in the housing for converting between an information containing electrical signal and a modulated optical signal corresponding to the electrical including a transmitter subassembly including first and second lasers operating at different wavelengths and modulated with respective first and second electrical signals for emitting first and second laser light beams, and an optical multiplexer for receiving the first and second beams and multiplexing the respective optical signals into a single multi-wavelength beam.

Additional objects, advantages, and novel features of the present invention will become apparent to those skill in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
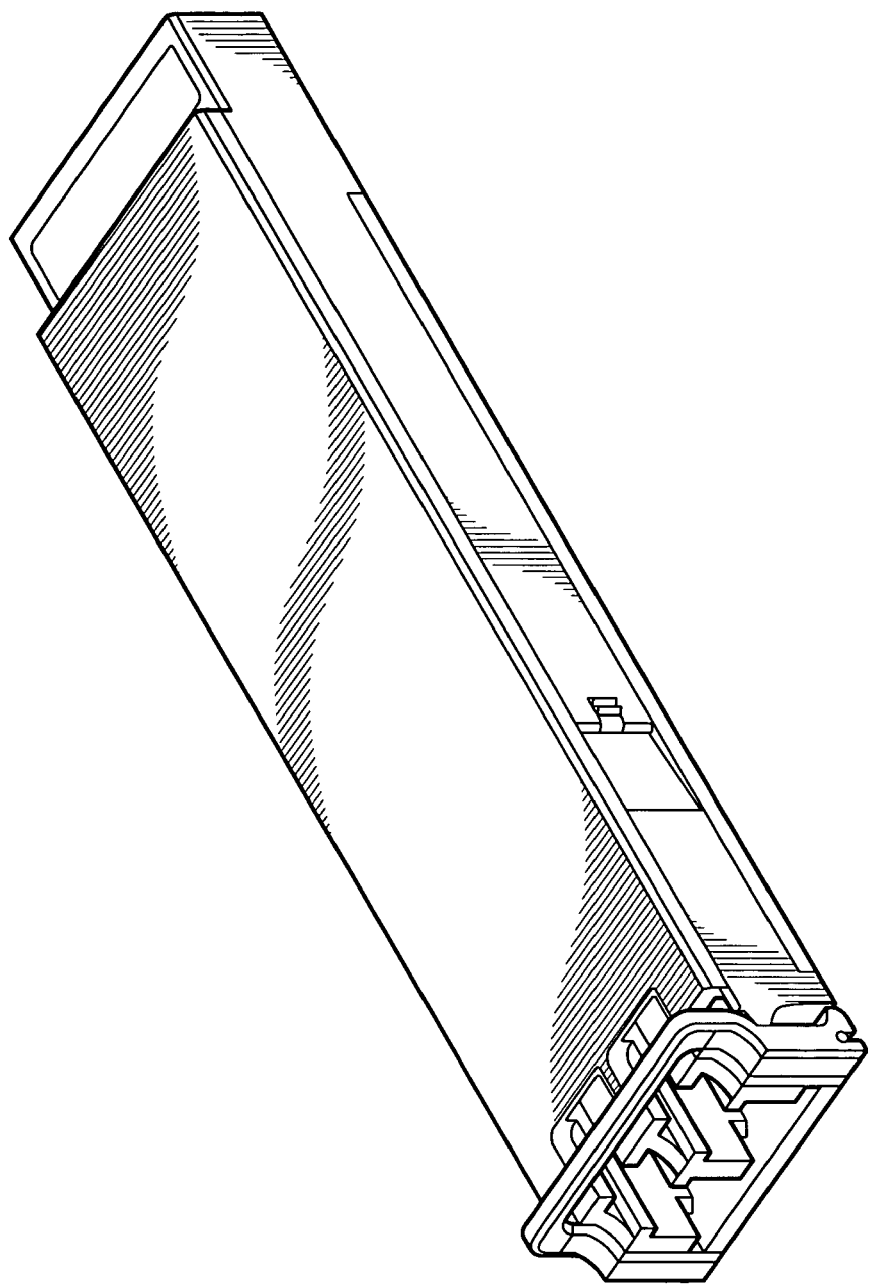
FIG. 1 is a perspective view of an optical transceiver module in which an exemplary embodiment in accordance with aspects of the present invention may be implemented.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

FIG. 1 is a perspective view of an optical transceiver module 100 in which an exemplary embodiment in accordance with aspects of the present invention may be implemented. In particular, FIG. 1 depicts the XFP form factor as is known in the prior art.

Figure 2:
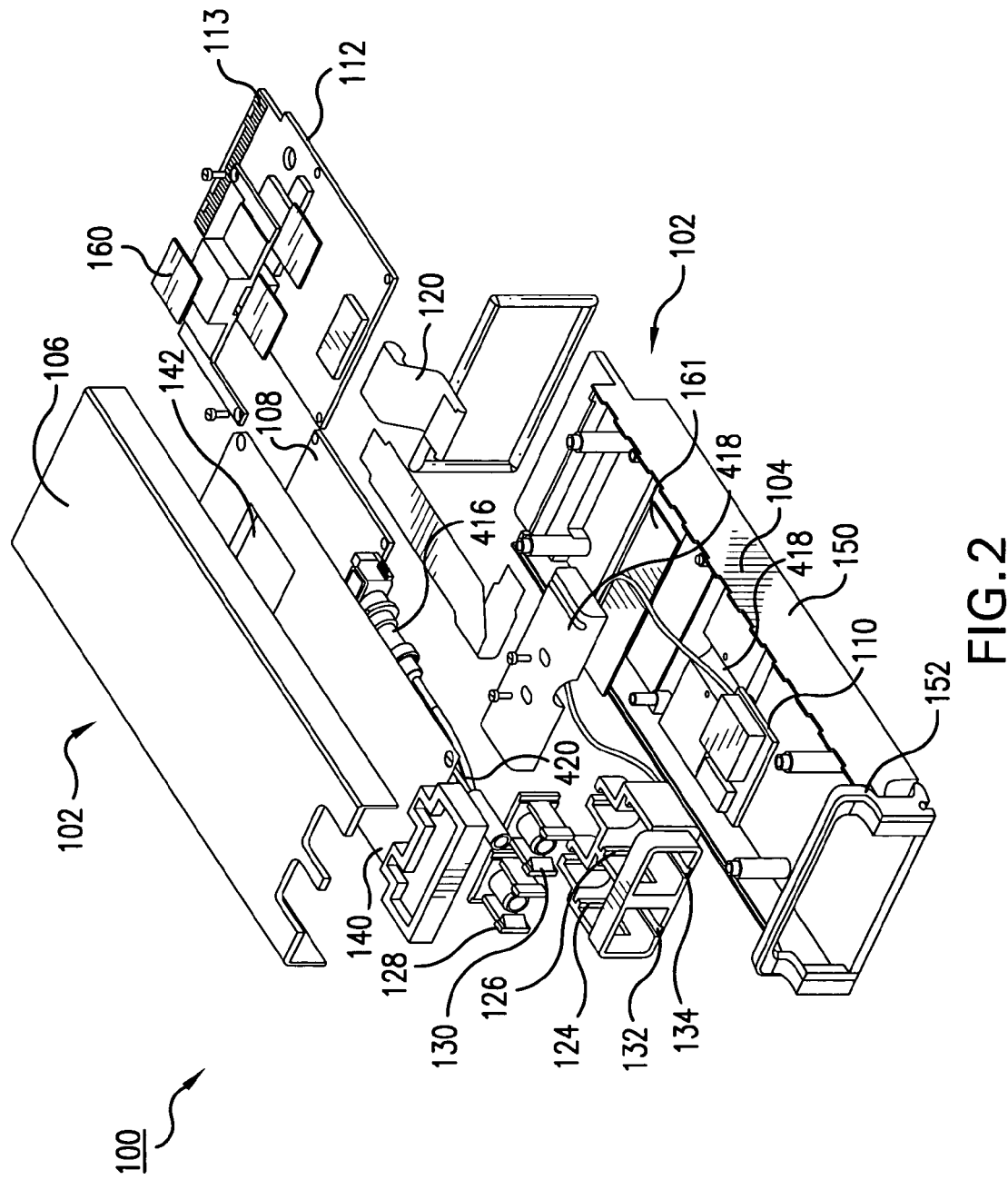
FIG. 2 is an exploded perspective view of an optical transceiver module in accordance with aspects of the present invention may be implemented.

Referring now to FIG. 2, there is shown an exploded view of an exemplary pluggable optical transceiver module 100 according to a preferred embodiment of the present invention. In this particular embodiment, the module 100 is compliant with the IEEE 802.3ae 10GBASE-LX4 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured in various alternate form factors such as XENPAK, X2, etc. The module 100 is preferably a 10 Gigabit Wide Wavelength Division Multiplexed (WWDM) transceiver having four 3.125 Gbps distributed feedback lasers that enable 300 meter transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes four distributed feedback (DFB) semiconductor lasers mounted which may be mounted in a single, hermetically sealed enclosure 415, which interfaces to a fiber coupling subassembly 416. The transmit board 108 is secured in place at the bottom of the housing using a brace 418 attached to the coupling subassembly 416. The brace also functions as a heat sink for dissipating heat from the metallic fiber coupling subassembly 416. In addition, the transmit board 108 and receive board 110 are connected to the PCS/PMA board 112 by respective flex interconnects 120, or other board-to-board electrical connectors or cables. Thermally conductive gap pads may be provided to transmit the heat generated by the lasers or other components in the transmitter subassembly to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as FlexPlane™ available from Molex, Inc. of Lisle, Ill., although other flexible substrate may be used as well. The optical fiber 420 originating from the transmitter subassembly is thereby routed to the transmit optical connector plug 130, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover 106 to contact a heat transmission gap pad 160, so as to provide access and a heat conductive path to the mounted components on the board 112. This area on the board 112 normally would be inaccessible if not for the opening 142. For example, a heat sink may be installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment, the transceiver 100 is manufactured in a modular manner using three separate subassemblies mounted in the housing—a transmitter subassembly, a receiver subassembly, and a protocol processing board, with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside the housing.

Figure 3:
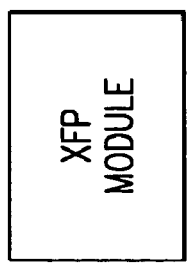
FIG. 3 is a block diagram showing the electrical signal interfaces between a network unit and the XFP module as known in the prior art.
Figure 3:
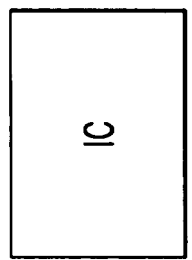
Figure 3:
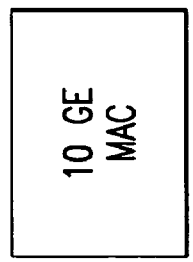
Figure 3:
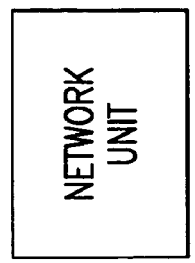
Figure 4:
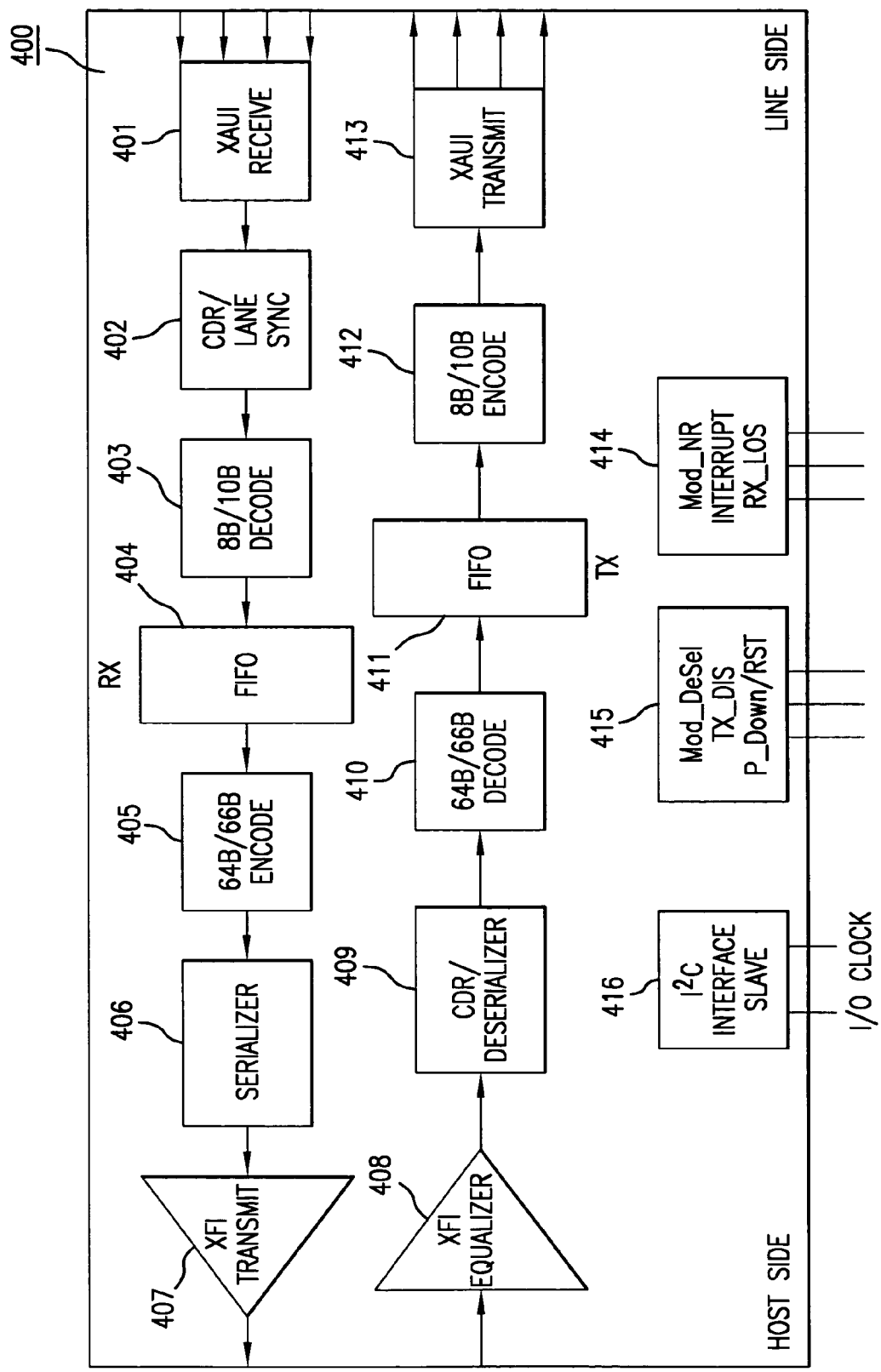
FIG. 4 is a block diagram of the XFI/XAUI conversion integrated circuit according to the present invention.

FIG. 3 is a block diagram showing the electrical signal interfaces between a network unit and the XFP module as known in the prior art. The network unit 200 is connected to a 10 Gigabit Ethernet (GE) media access controller (MAC) 201. The interface between the network unit 200 and the MAC 201 is typically a System Packet Interface Level 4 (SPI-4) defined by the Optical Internetworking Form Implementation Agreement OIF-SP04-02.1 (see www.oiforum.com). In particular, SPI-4 is an interface for packet and cell transfer between a physical layer (PHY) device and a link layer device, for aggregate bandwidths of OC-192 ATM and Packet over SONET/SDH(POS), as well as 10 Gb/s Ethernet applications.

Since the MAC electrical interface on the optical side is XAUI, and the XFP module 100 utilizes an XFI interface, an integrated circuit 202 is utilized to convert from XAUI to XFI. The XFI side of the IC 202 is then interfaced with the XFP module 100.

The XFI ("Ziffy") interface is defined in the XFP MSA as a high-speed serial electrical interface with a nominal baudrate of 9.95–11.1 Gb/s. The electrical interface is based on high speed low voltage AC coupled logic with a nominal differential impedance of 100 ohms. It is designed to support SONET OC-192, IEEE Std-802.3ae, 10 GFC and G.709 (OUT-2) applications. For the purposes of the XFP-LX4 module the XFI interface should at a minimum support IEEE.Std 802.3ae 10 Gigabit Ethernet at 10.3125 Gb/s. The XFI channel should be compliant to the datacom jitter and differential output masks defined in the XFP MSA standard. Although the XFI interface is the preferred embodiment, other serial interfaces could be utilized as well.

Ideally, the XFI-XAUI device should be able to derive its timing from a +/−100 PPM Baudrate/64 clock signal provided by the host system. If the host does not provide this optional clock, then a crystal oscillator will be placed in the module.

The XFI-XAUI device has the following hardware pins for control and status:
MOD_DeSel
TX_DIS
MOD_NR
Interrupt
RX-LOS MOD_DeSel The MOD-DeSel is an input pin. When held low by the host, the module response to 2-wire serial communication commands. When the pin is pulled high the device shall not respond to or acknowledge any 2-wire interface communication.

TX-DIS

TX-DIS is an input pin. When TX_DIS is asserted High, the XFP module transmitter output must be turned off. Ideally, the device would also have four TX-DIS output pins that would connect to the individual laser drivers in the module.

P_Down/RST

This is a multifunction pin for module Power Down and Reset. When held High the module shall be placed in Low Power mode with all functionally disabled except for I2C communication, laser safety features, and variable power supply functions. The negative edge of P_Down/RST signal initiates a complete module reset.

MOD_NR

The MOD-NR is an output pin that when High indicates that the module has detected a condition that renders transmitter and/or receiver data invalid. It shall consist of the logical OR of Transmitter LOL, Transmitter Laser Fault, and Receiver LOL. Inputs that trigger LASO in the XENPAK MSA should probably also be included.

Interrupt

Interrupt is an output pin. It should be pulled Low to indicate possible module operational fault or a status critical to the host system. The logic for this pin is defined in section 5.11 of the XFP MSA standard.

RX_LOS

RX_LOS is an output pin. It should be pulled High to indicate insufficient optical power for reliable signal reception. Ideally, the device should also have four RX-LOS input pins to connect to the digital status signals provided by the optical receiver.

Management Interface

Communication with the device shall be performed with the 2-wire interface described in Chapter 4 of the XFP MSA. The address of the device shall be OxaO. The device shall mirror the contents of an EEPROM to report vendor specific information. The memory map should be set up according to Chapter 5 of the XFP MSA. The internal I$^2$C bus used to communication with the NVRAM should also be able to provide I$^2$C communication to digital potentiometers or laser controllers.

Digital Optical Monitoring (DOM)

The XFP standard was created for single channel devices. Therefore, all DOM registers shall be populated based on a fixed representative channel. The data shall be mirrored from a DOM device inside the module with an address specified in the Vendor Specific register space. The parameters measured shall be transceiver temperature, TX bias current, TX output power, received optical power, and VCC2 voltage.

Variable Power Supply (VPS)

The "Bypassed Regulator Mode" option in section 5.7 of the XFP MSA standard is preferred for the XFP-LX4. The XFI-XAUI device must contain the necessary logic to enable this function, which may include a digital output hardware pin.

Loopback Modes

At a minimum the XFI-XAUI device shall implement the following loopback modes:

XFI loopback
XAUI loopback
Analog XAUI loopback

Section 5.3 of the XFP MSA standard details the control of the loopback modes.

The invention claimed is:

1. An optical transceiver for converting and coupling an information-containing electrical signal with an optical fiber comprising:

a housing including an electrical connector with a single line serial electrical interface for coupling with an external electrical cable or information system device and for transmitting and/or receiving an information-containing electrical signal, and a fiber optic connector adapted for coupling with an external optical fiber for transmitting and/or receiving an optical communications signal, wherein the housing includes a base member and a cover member forming a pluggable module conforming to the XFP Multi Source Agreement; and at least one electro-optical subassembly in the housing for converting between an information-containing electrical signal and a modulated optical signal corresponding to the electrical signals including a transmitter subassembly including first and second lasers operating at different wavelengths and modulated with respective first and second electrical signals for emitting first and second laser light beams; and an optical multiplexer for receiving said first and second beams and multiplexing the respective optical signals into a single multi-wavelength beam that is coupled to said fiber optic connector for transmitting the optical signal to an external optical fiber.

2. A transceiver as defined in claim 1, wherein one of said electro-optical subassemblies is a receiver subassembly including an optical demultiplexer coupled to said fiber optic connector for receiving a multi-wavelength optical signal having a plurality of information-containing signals each with a different predetermined wavelength and demultiplexing the optical signal into distinct optical beams corresponding to said predetermined wavelengths; and a substrate forming an optical reference plane and including first and second photodiodes disposed thereon in the path of said first and second beams respectively, the photodiodes functioning to convert the respective optical signals into an electrical signal that is coupled to said electrical connector for transmitting the electrical signal to an electrical cable or external information system device.

3. A transceiver as defined in claim 2, further comprising an array of individual photodetectors and wherein the optical demultiplexer includes an optical block with a plurality of wavelength selecting elements and reflectors operative to direct the optical beams from each respective wavelength selecting element to respective ones of a plurality of spatially separated image positions corresponding to the locations of discrete photodetectors.

4. An optical transceiver as defined in claim 1, wherein an electro-optical subassembly includes a plurality of lasers with each laser emitting a laser beam of different wavelength; and an optical multiplexer for receiving and multiplexing the respective laser beams into a single multi-wavelength beam that is coupled to the fiber optic connector for transmitting the single beam to an external optical fiber;

a plurality of optical fibers disposed within the housing extending between the plurality of lasers and the optical multiplexer; and a flexible substrate disposed within the housing for mounting the optical fibers thereto so as to prevent tangling of the optical fibers within the housing.

5. A transceiver as defined in claim 4, wherein the optical multiplexer is supported on said flexible substrate.

6. A transceiver as defined in claim 1, further comprising a photodiode array disposed on a printed circuit board in said receiver; and demultiplexer disposed in the receiver subassembly and positioned with respect to the optical reference plane defined by the surface of the printed circuit board surface, so that the output beam from the demultiplexer focuses on the photodiode array.

7. A transceiver as defined in claim 1, further comprising a communications protocol processing subassembly in the housing for processing the communications signal into a predetermined electrical or optical communications protocol.

8. A transceiver as defined in claim 7, wherein the protocol processing subassembly is compliant with IEEE 802.3ae 10GBASE-LX4.

9. A transceiver as defined in claim 1, wherein the single line serial electrical interface is an XFI interface.

* * * * *